(12) United States Patent
Liu et al.

(10) Patent No.: US 11,152,816 B2
(45) Date of Patent: Oct. 19, 2021

(54) POWER SUPPLY METHOD

(71) Applicant: WISTRON CORP., New Taipei (TW)

(72) Inventors: Chin-Min Liu, New Taipei (TW); Shan-Hsien Yang, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/926,888

(22) Filed: Jul. 13, 2020

(65) Prior Publication Data

US 2020/0343762 A1 Oct. 29, 2020

Related U.S. Application Data

(62) Division of application No. 15/940,865, filed on Mar. 29, 2018, now abandoned.

(30) Foreign Application Priority Data

Feb. 5, 2018 (TW) .................................. 107103943

(51) Int. Cl.
*H02J 9/06* (2006.01)
*H02J 7/00* (2006.01)
*G06F 1/3206* (2019.01)
*H02J 9/00* (2006.01)

(52) U.S. Cl.
CPC ................ *H02J 9/061* (2013.01); *H02J 7/00* (2013.01); *H02J 7/00036* (2020.01); *H02J 7/0068* (2013.01); *G06F 1/3206* (2013.01); *H02J 9/007* (2020.01)

(58) Field of Classification Search
CPC ...... G06F 1/263; G06F 1/3206; H02J 7/0004; H02J 7/0052; H02J 7/0068; H02J 9/061; H02J 2009/00

USPC .......................................................... 307/64
See application file for complete search history.

(56) References Cited

U.S. PATENT DOCUMENTS

| 4,766,394 A | 8/1988 | Yukawa |
| 2010/0079123 A1 | 4/2010 | Miyamae |
| 2019/0187766 A1* | 6/2019 | Hirosawa ......... G01R 19/16542 |

(Continued)

FOREIGN PATENT DOCUMENTS

| CN | 101751103 A | 6/2010 |
| CN | 102231596 A | 11/2011 |

(Continued)

OTHER PUBLICATIONS

TW Office Action cited in application No. 107103943 dated Sep. 14, 2018.

(Continued)

*Primary Examiner* — Toan T Vu
(74) *Attorney, Agent, or Firm* — McClure, Qualey & Rodack, LLP

(57) ABSTRACT

A power supply method includes the following steps: detecting whether a battery is installed in a system; delivering a control signal to a power conversion circuit by a controller when it is determined that the battery is not installed in the system; turning on part of a plurality of transistors and turning off the other part of the plurality of transistors by the power conversion circuit according to the control signal and a reference signal, so that an input voltage is delivered to a receiving terminal of the system from a sending terminal of the system through a current path.

3 Claims, 4 Drawing Sheets

(56) References Cited

U.S. PATENT DOCUMENTS

2020/0144839 A1\* 5/2020 De Vos ................ H02J 7/0024

FOREIGN PATENT DOCUMENTS

| TW | M243711 U | 9/2004 |
| TW | M435648 U | 8/2012 |

OTHER PUBLICATIONS

"Understanding USB-C Buck-Boost Battery Charging," Intersil Americas LLC, pp. 1-4 (2016).
CN Office Action in Application No. 2018101932815 dated Nov. 29, 2019.

\* cited by examiner

POWER SUPPLY METHOD

CROSS-REFERENCE TO RELATED APPLICATIONS

This application is a divisional application of U.S. patent application Ser. No. 15/940,865 filed in on Mar. 29, 2018, which claims priority under 35 U.S.C. § 119(a) on Patent Application No. 107103943 filed in Taiwan, R.O.C. on Feb. 5, 2018, the entire contents of which are hereby incorporated by reference.

TECHNICAL FIELD

The disclosure relates to a power supply method, more particularly to a power supply method adapted to a system without a battery installed.

BACKGROUND

Currently, the power supply methods of laptops are mainly implemented based on techniques of Type-C power transmission. If a support of a wide input voltage range is desired, then the uses of Buck-Boost Charger ICs become necessary. However, in the condition in which a conventional Buck-Boost Charger is used, a buck-conversion is still performed to convert an input voltage to a charging voltage before the system is powered on for the next DC-DC conversion even though the system is not equipped with a battery. In this case, an unnecessary voltage conversion, namely the aforementioned buck-conversion, is performed in the system, and the unnecessary voltage conversion will cause power loss of the system.

In other words, when the system is not equipped with a battery, it causes unnecessary energy loss. When the importance of environmental awareness is raised, many customers require that the designs of electronic products must comply with international environmental regulations, such as the energy star 7.0. Therefore, in order to meet the demands of environmental protection and energy saving, it is an important issue in the field to reduce unnecessary power consumption in system power supply, so as to improve the overall efficiency of the power conversion of the system.

SUMMARY

A power supply method is disclosed according to another embodiment of the present disclosure. The method includes the following steps: detecting whether a battery is installed in a system; triggering a switch circuit by a set of triggering signals so as to conduct a current path when the battery is not installed in the system; sending a control signal to a power conversion circuit further by a controller when the battery is not installed in the system; controlling a plurality of first transistors by the power conversion circuit according to the control signal; and delivering an input voltage to a receiving terminal of the system from a sending terminal of the system through the current path by the system.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
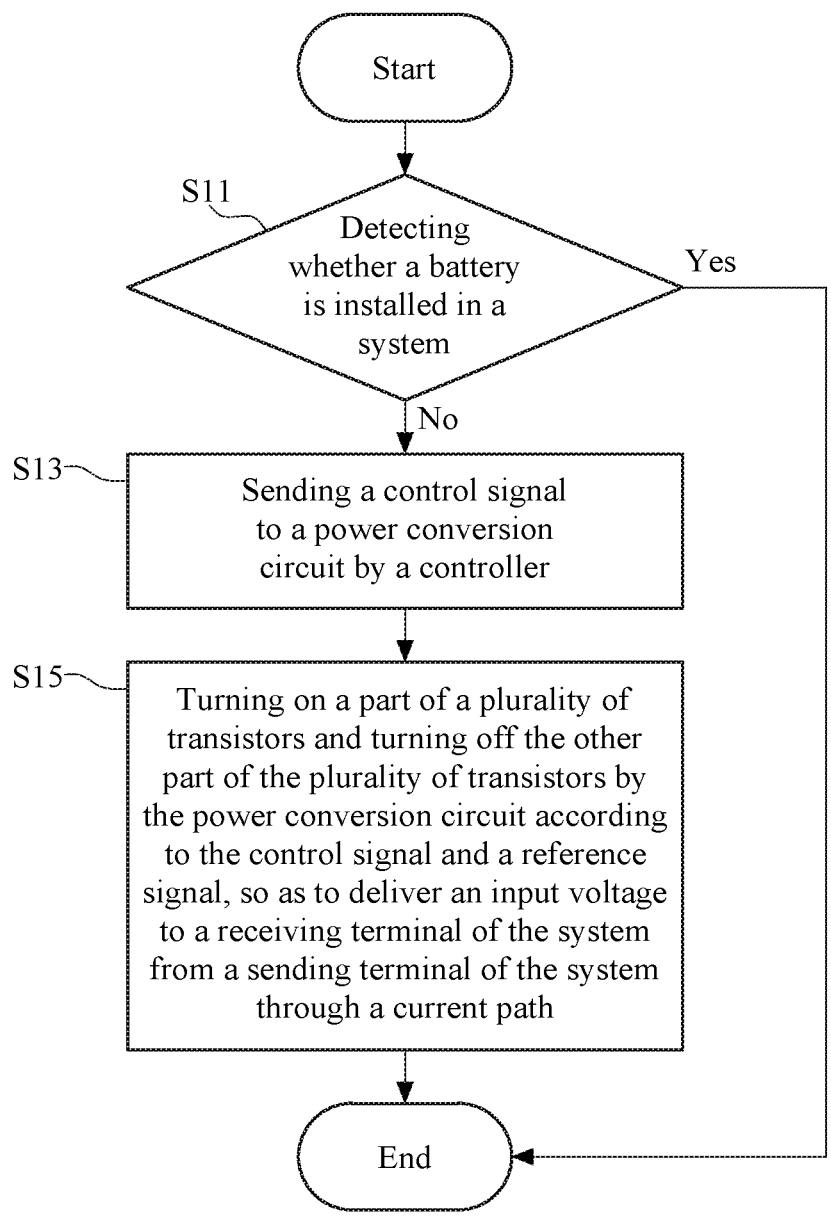
FIG. 1 is a flow chart of a power supply method according to one embodiment of the present disclosure.
Figure 2:
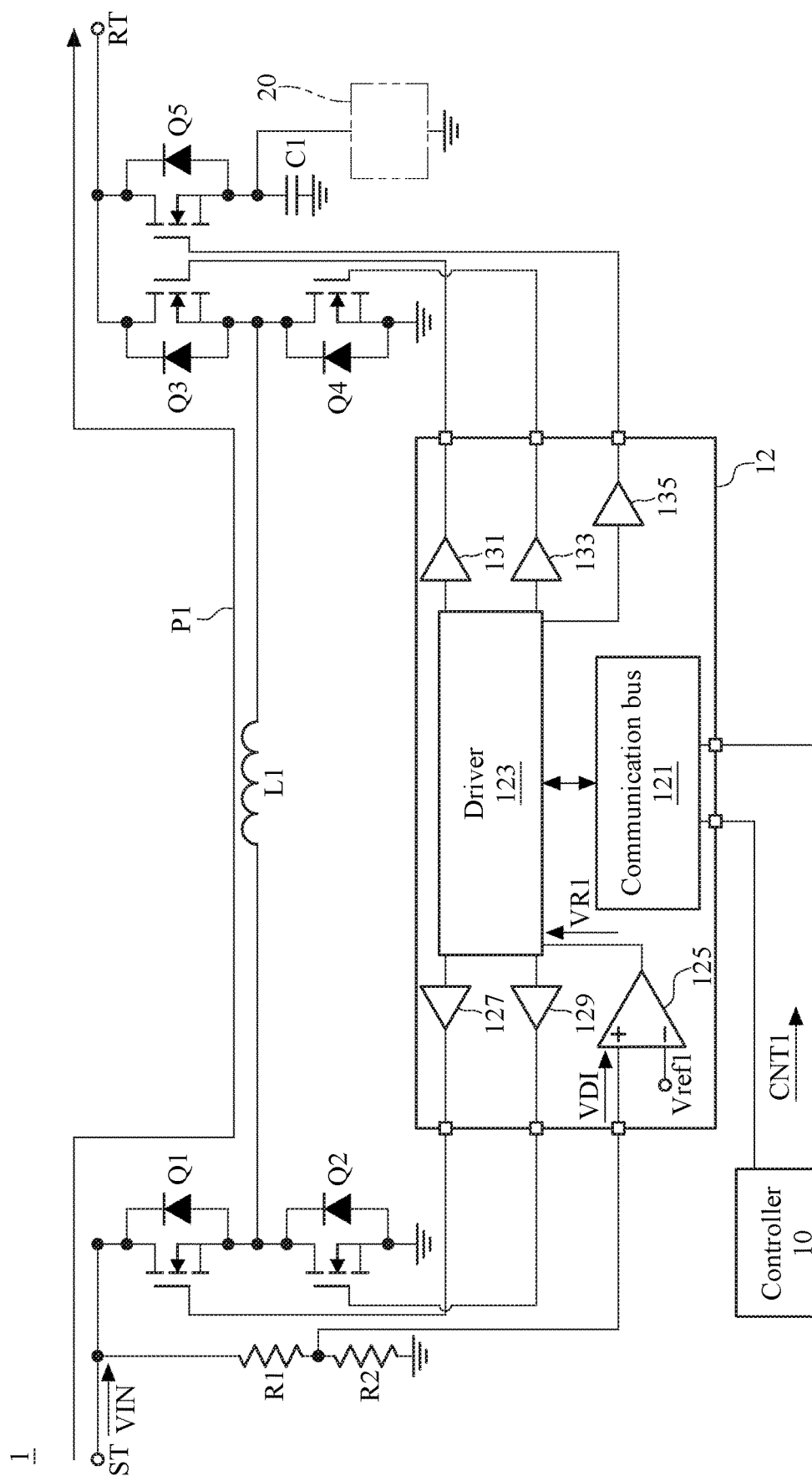
FIG. 2 is a diagram of a power supply device of a system according to one embodiment of the present disclosure.

Please refer to FIG. 1 and FIG. 2. FIG. 1 is a flow chart of a power supply method according to one embodiment of the present disclosure and FIG. 2 is a diagram of a power supply device of a system according to one embodiment of the present disclosure. As shown in figures, in step S11, A system 1 detects whether a battery 20 is installed in the system 1. As shown in FIG. 2, if the system 1 determines that the battery 20 is not installed in the system (the battery 20 not installed is presented in "dotted block"), the controller 10 sends a control signal CNT1 to a power conversion circuit 12 in step S13. In step S15, the power conversion circuit 12 turns on a part of transistors Q1-Q4 and turns off the other part of transistors Q1-Q4 according to the control signal CNT1 and a reference signal VR1, so that the input voltage VIN is delivered to a receiving terminal RT of the system 1 from a sending terminal ST of the system 1 through a current path P1. In another example, if the system 1 determines that the battery 20 is installed in the system 1, the process of the power supply method ends. In practice, the battery 20 is adapted to be connected between a capacitor C1 and a transistor. The controller 10 is an embedded controller (EC) having a certain storage capacity for storing codes required by the system.

FIG. 2 shows part of the system 1 only (namely the power supply device). In practice, the system 1 further includes backend equipment connected to the receiving terminal RT of the system 1 (not shown in figures), and the input voltage VIN coming from the sending terminal ST of the system 1 is a working voltage, such as 19.5 volts, adapted to the system. In one embodiment, step S15 of turning on the part of transistors Q1-Q4 and turning off the other part of transistors Q1-Q4 by the power conversion circuit 12 according to the control signal CNT1 and the reference signal VR1 includes sub-step I and sub-step II. In sub-step I, a communication bus 121 included in the power conversion circuit 12 receives the control signal CNT1 and sends the control signal CNT1 to the driver 123. Then, in sub-step II, the driver 123 turns on the part of the transistors Q1-Q4 and turns off the other part of the transistors Q1-Q4 according to the control signal CNT1 and the reference signal VR1. Specifically, the driver 123 receives the control signal CNT1 from the controller 10 through the communication bus 121. The driver 123 further sends out several signals via those amplifiers 127-133 according to the control signal CNT1 and the reference signal VR1, so as to correspondingly turn on the transistors Q1 and Q3 and turn off the transistors Q2 and Q4. In an implementation, the communication bus 121 is an inter-integrated circuit bus (I2C bus) and the driver 123 includes a PWM modulator.

In one embodiment, step S15 of delivering the input voltage VIN to the receiving terminal RT of the system 1 from the sending terminal ST of the system 1 through the current path P1 includes delivering the input voltage VIN to the receiving terminal RT of the system from the sending terminal ST of the system 1 through the transistors Q1 and Q3 turned on and an inductor L1. In other words, when the driver 123 turns on the transistors Q1 and Q3 and turns off the transistors Q2 and Q4, the input voltage VIN passes through the transistors Q1 and Q3 turned on as well as the inductor L1 instead of passing through the transistors Q2 and Q4 turned off. It means that the input voltage VIN passes through the current path P1. Therefore, a buck-conversion is not performed in the process that the input voltage VIN is delivered to the receiving terminal RT from the sending terminal ST.

More specifically, in order to meet a voltage demand of a battery, the conventional system is designed to convert the input voltage VIN from 19.5 volts to 12 volts by performing a buck-conversion, so as to charge the battery. However, the conventional system still performs the buck-conversion even though the system is not installed with the battery. Since the backend equipment of the system is capable of operating based on either 12 volts of the battery or 19.5 volts of the input voltage VIN, the buck-conversion is an unnecessary voltage conversion in the condition in which the system is not installed with the battery. Such unnecessary voltage conversion will lead to power loss and poor power conversion efficiency.

By implementing the power supply method, the system is capable of directly delivering the input voltage to the backend equipment without performing the buck-conversion as the system determines that the battery is not installed in the system, so that the power loss is reduced and the efficiency of overall power conversion of the system is raised. Please refer to table 1 shown below for illustrating the advantage of the present disclosure by using experimental data. The table 1 shows the comparisons of power consumption performances between the conventional system and the system shown in FIG. 1 and FIG. 2 of the present disclosure with respect to different states. The table 1 indicates that the power consumption performance of the system using the power supply method provided by the present disclosure is better than the power consumption performance of the conventional system with respect to states STA1-STA4. The state STA1 represents an off-state, the state STA2 represents a sleeping-state, the state STA3 represents a short-idle state and the state STA4 represents a long-idle state.

TABLE 1

| state | Power consumption of the conventional system (W) | Power consumption of the system of the present disclosure (W) |
|---|---|---|
| STA1 | 0.426 | 0.314 |
| STA2 | 0.735 | 0.649 |
| STA3 | 7.79 | 6.796 |
| STA4 | 5.625 | 4.792 |

In one embodiment, the aforementioned power supply method further includes generating the reference signal VR1 by a comparator 125 included in the power conversion circuit 12 according to a system divided voltage VDI and a reference voltage Vref1. Specifically, as shown in FIG. 2, the power conversion circuit 12 includes a comparator 125. One input terminal (+) of the comparator 125 is connected between a resistor R1 and a resistor R2 to receive a system divided voltage VDI and the other input terminal (−) of the comparator 125 receives a reference voltage Vref1. The electric potential of the reference signal VR1 is determined by the comparator 125 according to the electric potentials of the system divided voltage VDI and the reference voltage Vref1. In other words, the electric potential of the reference signal VR1 is related to the electric potentials of the input voltage VIN and the reference voltage Vref1.

In a practical example, when the reference signal VR1 has a high electric potential, the driver 123 uses the control signal CNT1 to turn on the transistors Q1, Q3 and turn off the transistors Q2, Q4. When the reference signal VR1 has a low electric potential, the driver 123 does not use the control signal CNT1 to turn on the transistors Q1, Q3 and turn off the transistors Q2, Q4. In another practical example, when the reference signal VR1 has a low electric potential, the driver 123 uses the control signal CNT1 to turn on the transistors Q1, Q3 and turn off the transistors Q2, Q4. When the reference signal VR1 has a high electric potential, the driver 123 does not use the control signal CNT1 to turn on the transistors Q1, Q3 and turn off the transistors Q2, Q4.

Figure 3:
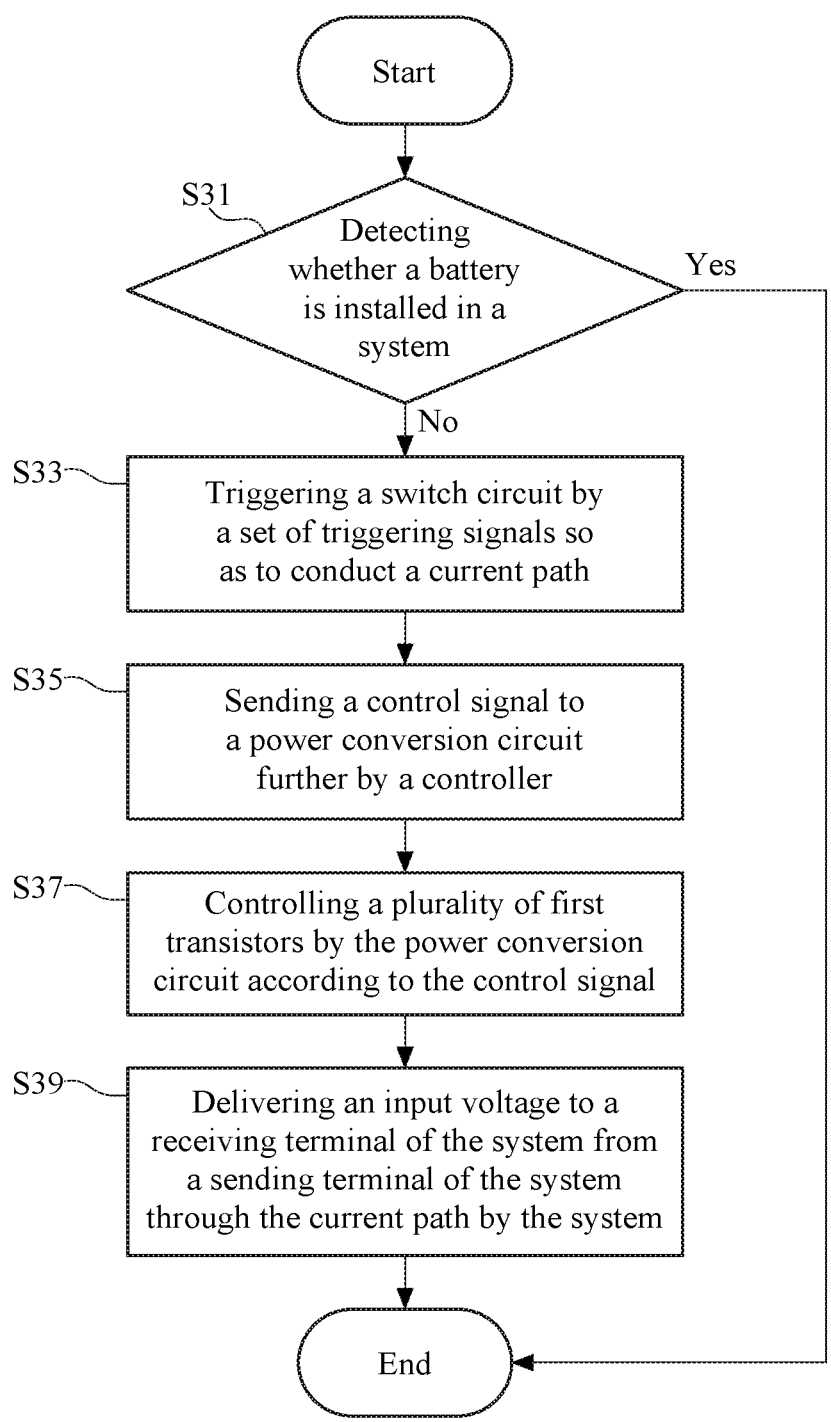
FIG. 3 is a flow chart of a power supply method according to another embodiment of the present disclosure.
Figure 4:
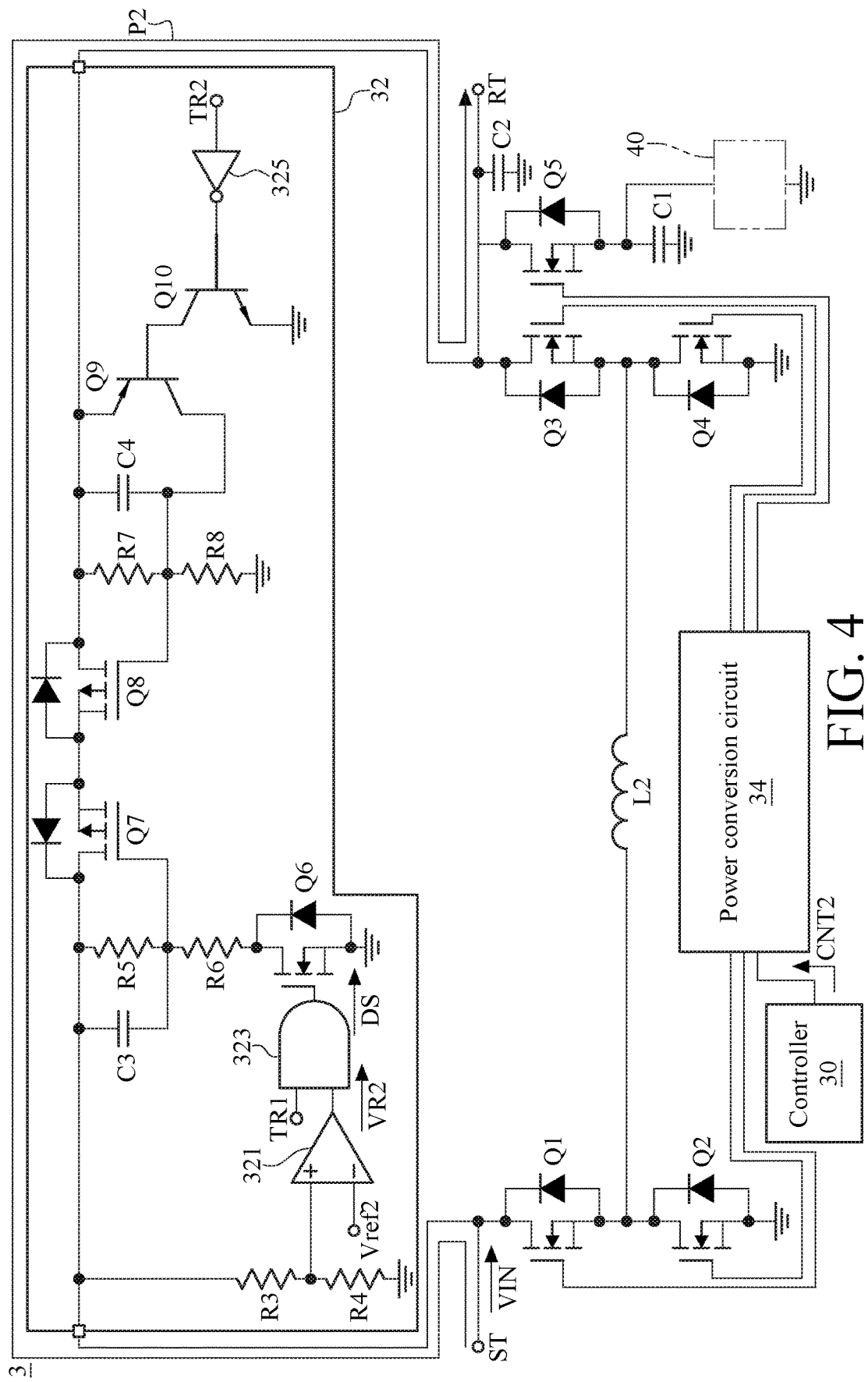
FIG. 4 is a diagram of a power supply device of a system according to another embodiment of the present disclosure.

In the aforementioned embodiments of FIG. 1-2, the transistors Q1-Q4 are controlled by the power conversion circuit 12 so that the input voltage VIN is supplied to the backend equipment of the system through the current path P1. In another embodiment, the power supply device of the system is equipped with a switch circuit so as to drive the input voltage VIN to be supplied to the backend equipment of the system through another current path. Please refer to FIG. 3 and FIG. 4. FIG. 3 is a flow chart of a power supply method according to another embodiment of the present disclosure and FIG. 4 is a diagram of a power supply device of a system according to another embodiment of the present disclosure. The embodiments of FIG. 3-4 are basically similar to the embodiments of FIG. 1-2. The significant difference between FIG. 3-4 and FIG. 1-2 lies in the use of the switch circuit and the controlling for the transistors. As shown in FIG. 3 and FIG. 4, in step S31, detect whether a battery 40 is installed in the system 3. When it is determined that the battery 40 is not installed in the system 3 (the battery 40 not installed is presented in "dotted block"), step S33 is performed. In step S33, the switch circuit 32 is triggered by a set of triggering signals TR so as to conduct a current path P2. Further, step S35 is performed. In step S35, a control signal CNT2 is sent to a power conversion circuit 34 by the controller 30.

In step S37, a plurality of first transistors Q1-Q4 is controlled by the power conversion circuit 34 according to the control signal CNT2. In step S39, an input voltage VIN is delivered to a receiving terminal RT of the system 3 from a sending terminal ST of the system 3 through the current path P2 by the system 3. In practice, the battery 40 is configured to be connected between the capacitor C1 and the transistors Q5 and the receiving terminal RT is connected to a capacitor C2. In one embodiment, step S37 of controlling the transistors Q1-Q4 by the power conversion circuit 34 according to the control signal CNT2 includes turning off all of the transistors Q1-Q4 by the power conversion circuit 34 according to the control signal CNT2. In other words, in this embodiment, since all of transistors Q1-Q4 are turned off, the input voltage VIN is directly delivered to the receiving terminal RT from the sending terminal ST through the switch circuit 32 on the current path P2. In this embodiment, the input voltage VIN, delivered to the receiving terminal RT of the system 3 through the switch circuit 32, will not be processed by a buck conversion. For example, if the input voltage VIN initially provided from the sending terminal ST of the system 3 is around 19.5 volts, the input voltage VIN received by the receiving terminal RT of the system 3 through the switch circuit 32 remains around 19.5 volts.

Thereby, an unnecessary voltage conversion (namely "the buck conversion") is avoided in the system, so that the power loss of the system is reduced and the overall efficiency of the power conversion of the system is raised. Please refer to table 2 shown below for illustrating the advantage of the present disclosure by using experimental data. The table 2 shows the comparisons of power consumption performances between the conventional system and the system shown in FIG. 3 and FIG. 4 of the present disclosure with respect to different states. The table 2 indicates that the power consumption performance of the system using the power supply method provided by the present disclosure is better than the power consumption performance of the conventional system with respect to states STA1-STA4. The state STA1 represents an off-state, the state STA2 represents a sleeping-state, the state STA3 represents a short-idle state and the state STA4 represents a long-idle state.

TABLE 2

| state | Power consumption of the conventional system (W) | Power consumption of the system of the present disclosure (W) |
| --- | --- | --- |
| STA1 | 0.431 | 0.32 |
| STA2 | 0.741 | 0.659 |
| STA3 | 7.795 | 6.802 |
| STA4 | 5.631 | 4.801 |

In one embodiment, step S33 of triggering the switch circuit 32 by the set of triggering signals TR so as to conduct the current path P2 includes the following two sub-steps. In sub-step I: a second transistor Q7 on the second current path P2 is turned on by a first triggering signal TR1 included in the set of triggering signals TR and a reference signal VR2. Then, in sub-step II: a third transistor Q8 on the current path P2 is turned on by a second triggering signal TR2 included in the set of triggering signals TR. In one embodiment, step S33 of turning on the second transistor Q7 on the current path P2 by the first triggering signal TR1 included in the set of triggering signals TR and the reference signal VR2 includes outputting an electric potential signal DS by a logic gate 323 according to the first triggering signal TR1 and the reference signal VR2, so that the second transistor Q7 is turned on according to the electric potential signal DS.

Specifically, as shown in FIG. 4, when it is determined that the battery 40 is not installed in the system 3, the system 3 generates the set of triggering signals TR including the first triggering signal TR1 and the second triggering signal TR2. The first triggering signal TR1 is outputted to the logic gate 323. One input terminal (+) of the comparator 321 receives a divided voltage signal related to a resistor R3 and a resistor R4, and the other input terminal (−) receives a reference voltage Vref2. The comparator 321 outputs the reference signal VR2 to the logic gate 323 according to the divided voltage signal and the reference voltage Vref2. Further, the logic gate 323 turns on a transistor Q6 according to the first triggering signal TR1 and the reference signal VR2. Accordingly, a divided voltage is generated between a resistor R5 and a resistor R6 so as to turn on the transistor Q7. In practice, the electric potential of the first triggering signal TR1, which is used for triggering the system 3, could be adjusted by properly selecting the resistance values of the resistors R3 and R4. In a practical example, when the electric potential of the divided voltage signal is set to be higher than the electric potential of the reference voltage Vref2 by selecting specific resistance values of the resistors R3 and R4, the reference signal VR2 outputted by the comparator 321 has a high electric potential. In this case, the first triggering signal TR1 could be set to have a high electric potential, so that the electric potential signal DS outputted by the logic gate 323 (e.g. AND Gate) has a high electric potential for turning on the transistor Q6.

Furthermore, the second triggering signal TR2 is outputted through an amplifier 325 to tuning on the transistor Q10. Accordingly, a transistor Q9 is turned on so that a divided voltage is generated between a resistor R7 and a resistor R8 for turning on a transistor Q8. In other words, when the switch circuit 32 is triggered by the set of triggering signals TR, the transistors Q7 and Q8 on the current path P2 are turned on accordingly. Therefore, the input voltage VIN is directly supplied to the backend equipment of the system without being processed by a buck conversion. In a practical implementation, when the battery 40 is installed in the system 3 and the electric potential of the battery 40 is higher than the electric potential of the voltage VIN, the system 3, by taking the advantage of the circuit shown in FIG. 4, is capable of preventing the voltage of the battery 40 being reversely provided to the sending terminal ST. Therefore, an occurrence of circuit malfunction is avoided and the stability of the system is ensured.

Based on the above description, in the power supply method disclosed in the present disclosure, by controlling on/off states related to a plurality of first transistors and using a switch circuit selectively, the system is capable of directly inputting the input voltage into backend equipment of the system as a source of DC-DC conversion without performing a buck conversion. Thereby, an unnecessary voltage conversion is avoided in the process of power supply, so as to improve the overall efficiency of the power conversion of the system and meet the expectation of environmental protection regulations.

What is claimed is:

1. A power supply method, comprising:
   detecting whether a battery is installed in a system;
   triggering a switch circuit by a set of triggering signals so as to conduct a current path when the battery is not installed in the system;
   sending a control signal to a power conversion circuit further by a controller when the battery is not installed in the system;
   controlling a plurality of first transistors by the power conversion circuit according to the control signal; and
   delivering an input voltage to a receiving terminal of the system from a sending terminal of the system through the current path by the system,
   wherein triggering the switch circuit by the set of triggering signals so as to conduct the current path comprises:
   turning on a second transistor on the current path by a first triggering signal included in the set of triggering signals and a reference signal; and
   turning on a third transistor on the current path by a second triggering signal included in the set of triggering signals.

2. The power supply method according to claim 1, wherein controlling the plurality of first transistors by the power conversion circuit according to the control signal comprises turning off the plurality of first transistors by the power conversion circuit according to the control signal.

3. The power supply method according to claim 1, wherein turning on the second transistor on the current path by the first triggering signal included in the set of triggering signals and the reference signal comprises:

outputting an electric potential signal by a logic gate according to the first triggering signal and the reference signal so that the second transistor is turned on according to the electric potential signal.

\* \* \* \* \*